No. 885,710. PATENTED APR. 28, 1908.
J. E. BARKER.
VARIABLE SPEED GEAR.
APPLICATION FILED AUG. 10, 1907.
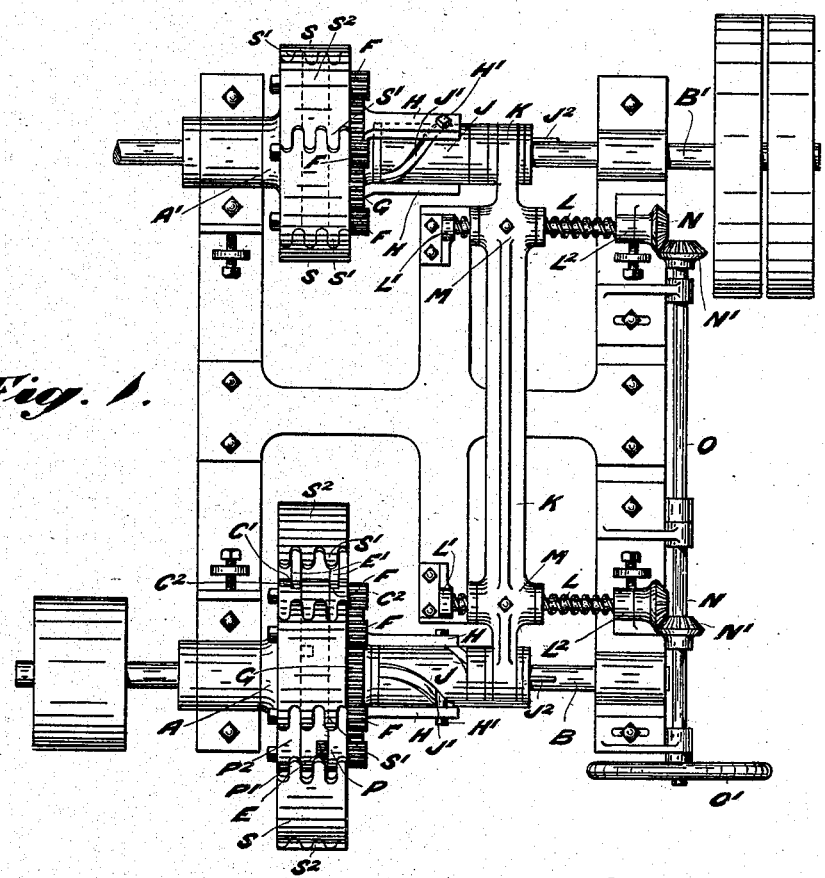
Fig. 1.
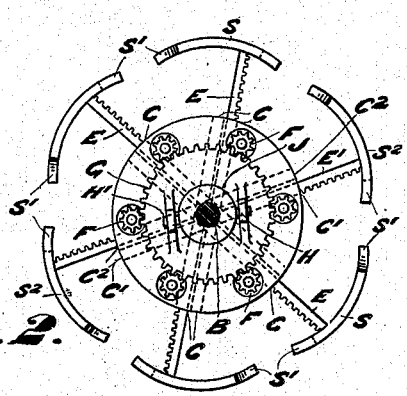
Fig. 2.
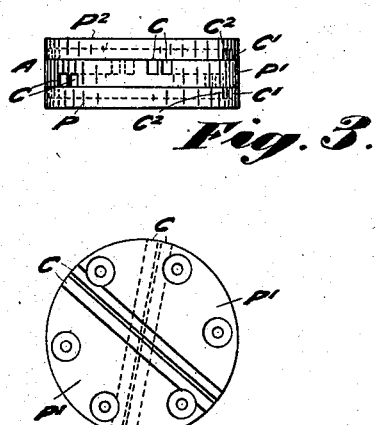
Fig. 3.
Fig. 4.
WITNESSES
W. P. Burke
INVENTOR
John Edward Barker
By Wm Wallace White
ATTY.

UNITED STATES PATENT OFFICE.

JOHN EDWARD BARKER, OF GREAT HORTON, BRADFORD, ENGLAND.

VARIABLE-SPEED GEAR.

No. 885,710.  Specification of Letters Patent.  Patented April 28, 1908.

Application filed August 10, 1907. Serial No. 388,037.

*To all whom it may concern:*

Be it known that I, JOHN EDWARD BARKER, a subject of the King of Great Britain and Ireland, whose postal address is 29 Gathorne street, Great Horton, Bradford, in the county of York, England, have invented certain new and useful Improvements in Variable-Speed Gear, of which the following is a specification.

This invention relates to improvements in variable speed gear particularly applicable to pulleys and other rotary bodies driven by belt, rope, chain, and other suitable means, and its object is to improve the efficiency of this class of transmission gear.

In describing my invention in detail, reference is made to the accompanying sheet of drawings, similar letters indicating similar parts, in which:—

Figure 1 represents a plan of a variable speed gear constructed according to my improvement. Fig. 2 represents an elevation of one of the gear changing wheels hereinafter referred to. Fig. 3 represents a plan of a portion of the periphery of the said wheel with the expanding arms removed. Fig. 4 is a detail hereinafter referred to.

In carrying out my invention, I employ, by preference, two disks A and $A^1$ carried on shafts B and $B^1$, one shaft being the driven and the other the driver, as shown in Fig. 1. The said shafts are parallel to one another, and the said disks are made up substantially in the manner hereinafter described. These disks carry a suitable number of expanding segments S, preferably serrated, as shown at $S^1$, (Fig. 1) in order that they may readily interlock when closed, and when open give as large a bearing as is permissible for the belt or the like connecting the two sets of segments and disks.

The disks A and $A^1$ are composed in the example shown in the drawings, and which I have found satisfactory, of three plates P, $P^1$, $P^2$, such plates being adapted for six segments B, though more or fewer of such segments and plates may be used, as desired. In each plate are formed a convenient number of slides C for the reception of toothed arms E by means of which the segments are carried, and expanded or contracted.

The opposite segments $S^2$ are provided with double arms $E^1$, the remainder being carried by single arms, though it must be understood I do not confine myself to this arrangement, the double arms $E^1$ of one segment $S^2$ operating in the slides $C^1$ as shown in Fig. 3, and the arms of the opposite segment $S^2$ in the slides $C^2$, the remaining arms working in the other slides C, formed in the central plate $P^1$ at each side thereof, as shown in Fig. 4, as will be readily understood.

Mounted in the disks and towards the periphery are small pinions or the like F, such pinions gearing into the racks of the arms E and $E^1$, and into what might be termed a sun wheel G, loosely mounted around the shaft. The sun wheel G is provided on its outer face with two arms or extensions H, which are in turn provided with fingers or projections $H^1$ towards their outer ends, these fingers engaging with a suitable thread or curved aperture $J^1$ formed in the periphery of a loose sleeve J, capable of a sliding motion on its shaft on the key $J^2$, (Fig. 1).

Each of the sleeves J is preferably provided with an annular groove at one end and such groove carries thereon anti-friction ball facings, (not shown in the drawings.) The sleeves are operated by means of a connecting bar K, which embraces at its ends the shafts B and $B^1$, the bar being actuated by means of two suitably threaded shafts L, mounted in suitable bearings $L'$ and $L^2$, such shafts passing through internally threaded bosses M on the bar K. One end of each shaft L is provided with a bevel wheel N which is operated by another bevel wheel $N^1$ carried on a shaft O operated by means of a wheel $O^1$ or other suitable mechanism.

The power is transmitted from one expanding pulley to the other by means of a belt or the like.

The thread $J^1$ in one sleeve J is formed in a contrary direction to that in the other, and as the bar K is operated, one pulley or set of segments is expanded, and the other contracted, and vice versa.

The space between the segments, when same are in their open position may be bridged over by means of a flexible extension attached to each segment, and extending a suitable distance round the periphery of the segments or pulley, and such extensions may be ribbed or fluted, so that the belt or the like may get a better grip of the pulley and allow the air to escape.

It will be understood that the segmental periphery may be constructed to suit various modes of driving.

The arrangement of the small pinions towards the periphery of the disks or the like, gives, as will be understood a much larger movement of the segments than would be permissible were the pinions placed nearer the center of the disks and the sun wheel made smaller.

I am aware that expanding and contracting pulleys have been used in various kinds of speed gearing, and that such pulleys have been made up of disks provided with slides for the reception of racks or toothed arms carrying segments, and that such racks have been operated either by one central pinion or by a series of pinions, operated by a main pinion or like, such pinion being capable of a sliding movement; but to the best of my knowledge and belief, the use of a sun wheel operating pinions carried towards the periphery of the pulley or disks in the manner hereinbefore described and shown is novel.

What I claim as my invention is:—

1. A variable speed gear comprising two disks each of which is made up of a plurality of segments, racked arms carrying said segments, pinions engaging the racked arms, a sun wheel for operating the pinions, arms connected with the sun wheels, sleeves having each a thread engaged by the arms and a bar for operating the sleeves, substantially as described.

2. A variable speed gear comprising a disk and expanding segments, racked arms carrying the segments, pinions engaging the racked arms and carried by the disk towards the periphery thereof, a sun wheel, a threaded sleeve and means for operating the sun wheel from the threaded sleeve, substantially as described.

In witness whereof, I have hereunto set my hand, in the presence of two witnesses.

JOHN EDWARD BARKER.

Witnesses:
 CLIVE WAUGH,
 JOSEPH P. KIRBY.